United States Patent [19]

Itoh

[11] Patent Number: 5,911,774
[45] Date of Patent: Jun. 15, 1999

[54] NAVIGATION AND POSITIONING SYSTEM AND METHOD FOR A VEHICLE

[75] Inventor: Tetsuya Itoh, Isehara, Japan

[73] Assignee: Nissan Motor Co., Ltd., Yokohama, Japan

[21] Appl. No.: 08/866,388

[22] Filed: May 30, 1997

[30] Foreign Application Priority Data

Nov. 20, 1996 [JP] Japan ..................................... 8-309560

[51] Int. Cl.⁶ .......................... G01C 21/00; G06F 165/00; G06G 7/78
[52] U.S. Cl. .......................... 701/207; 701/212; 701/213; 340/988; 340/990; 340/995
[58] Field of Search .............................. 701/200, 35, 49, 701/201, 207, 212, 213; 340/988, 990, 995; 342/357, 450, 451

[56] References Cited

U.S. PATENT DOCUMENTS

| | | | |
|---|---|---|---|
| 5,247,440 | 9/1993 | Capurka et al. | 364/424.05 |
| 5,359,528 | 10/1994 | Haendel et al. | 364/424.04 |
| 5,363,306 | 11/1994 | Kuwahara et al. | 364/449 |
| 5,731,978 | 3/1998 | Tamai et al. | 364/444.1 |

*Primary Examiner*—William A. Cuchlinski, Jr.
*Assistant Examiner*—Timothy R. Wyckoff
*Attorney, Agent, or Firm*—Foley & Lardner

[57] ABSTRACT

A navigation system detects a position of a vehicle, determines an area (i.e., a State) associated with the position of the vehicle, selects and loads a program corresponding to the area for controlling the provision of one or more navigation functions, and navigates the vehicle according to the loaded program. The program is based on a rule as to a navigation that is function enforced in the area in which the vehicle is located.

29 Claims, 16 Drawing Sheets

FIG.4

| | OPERATION | MAP INDICATION | DIRECTION | VOICE MESSAGE | PROGRAM |
|---|---|---|---|---|---|
| A st. | ○ | ○ | ○ | ○ | a |
| B st. | PROHIBITED ON MOVING | ○ | ○ | ○ | b |
| C st. | PROHIBITED ON MOVING | PROHIBITED | ○ | ○ | c |
| D st. | PROHIBITED ON MOVING | PROHIBITED | PROHIBITED | ○ | d |

○ : PERMITTED

FIG.10

| | OPERATION | MAP INDICATION | DIRECTION | VOICE MESSAGE |
|---|---|---|---|---|
| A st. | e | g | i | k |
| B st. | f | g | i | k |
| C st. | f | h | i | k |
| D st. | f | h | j | k |

5,911,774

NAVIGATION AND POSITIONING SYSTEM AND METHOD FOR A VEHICLE

The contents of Application No. TOKUGANHEI 8-309560, with a filing date of Nov. 20, 1996 in Japan, are hereby incorporated by reference.

BACKGROUND OF THE INVENTION

1. Field of the Invention

This invention relates to a navigation and positioning system and method for a vehicle, and more particularly to an on-board vehicle navigation system.

2. Related Art of the Invention

A navigation and positioning system boarded on a vehicle is known (see TOKUKAISHO, Japanese patent publication, No. 62-267900). This kind of navigation and positioning system indicates a map on a display to a driver and/or a passenger. When the user inputs a point of departure and the destination, the system calculates a proper course, i.e., the shortest course in distance for the destination, and indicates that course superimposing it upon the map.

The navigation and positioning system detects the position of the vehicle using the GPS (the global positioning system) and superimposes it on the map.

When the vehicle is approaching an intersection, the navigation system prompts the driver for which way to proceed, i.e., go straight, make a right/left turn etc., with an arrow sign on the display or by pre-recorded voice messages.

A user of the navigation and positioning system mentioned-above, however, must operate the system in compliance with the rule as to navigation systems enforced in the area in which his/her vehicle is moving. While the driver can drive his/her vehicle in areas with different navigation system rules, the system works similarly wherever the vehicle operates.

A vehicle may move from an area where no rule prohibits any function of a navigation system into an area where a rule bars indication of a map inside a moving vehicle. In this situation, the user must turn off the power of the display or the navigation system. This is inconvenient. Additionally, the user may be subject to liability for failure to comply.

SUMMARY OF THE INVENTION

Accordingly, it is an object of the present invention to provide a navigation system and method that functions automatically to obeys local rules pertaining to navigation and positioning systems enforced in the area where the vehicle is located.

It is another object of the invention to provide a navigation system and method that switches its function when the vehicle moves into an area where a different rule as to navigation is enforced so that the system obeys the rule in the new area.

It is still another object of the invention to provide a navigation system and method that rapidly determines the rule in an area.

Briefly, the above and other objects are achieved by a system and method comprising a detector to detect a position of a vehicle, a configurer to load a program, and a navigator to navigate according to the loaded program. The program is based on a rule which controls the provision of a navigation function enforced at the position of the vehicle.

The second aspect of the invention comprises, additionally, a program memory to store the program corresponding to an area, an area searcher to determine the area in which the vehicle is located, and the configurer to load a program corresponding to the area.

In the beginning, therefore, the area including the position of the vehicle is determined. Next, the program, which is based on the rule as to a navigation function enforced in the area, is configured. Finally, according to the program, the navigator functions implements the rule enforced in the area.

The third aspect of the invention comprises a map memory to store a map representing the area. The map is divided into plural divisions, and a program corresponds to each division.

The division in which the vehicle is located is determined. According to the determined division, the program corresponding to the division is loaded into the navigator. Therefore, determining the area is simplified and quick.

The fourth aspect of the invention comprises a plurality of links in the map, which respectively represents a road, with the link associated with at least one area. Moreover, the link has a border between the plural areas, and stores an area corresponding to one side of the border and another area corresponding to another side of the border.

According to the position of the vehicle on the link relative to the location of the border, one of the areas that includes the position of the vehicle is determined.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawings, which are incorporated in and constitute a part of the specification, illustrate presently preferred embodiments of the invention, and, together with the general description given above and the detailed description of the preferred embodiment given below, serve to explain the principles of the invention.

FIG. 4 is a table of a sample rule as to navigation functions and rule data corresponding thereto according to the second preferred embodiment of the present invention.

FIG. 10 is a table of rule data for to the third preferred embodiment of the present invention.

DETAILED DESCRIPTION OF THE PREFERRED EMBODIMENTS

Figure 1:
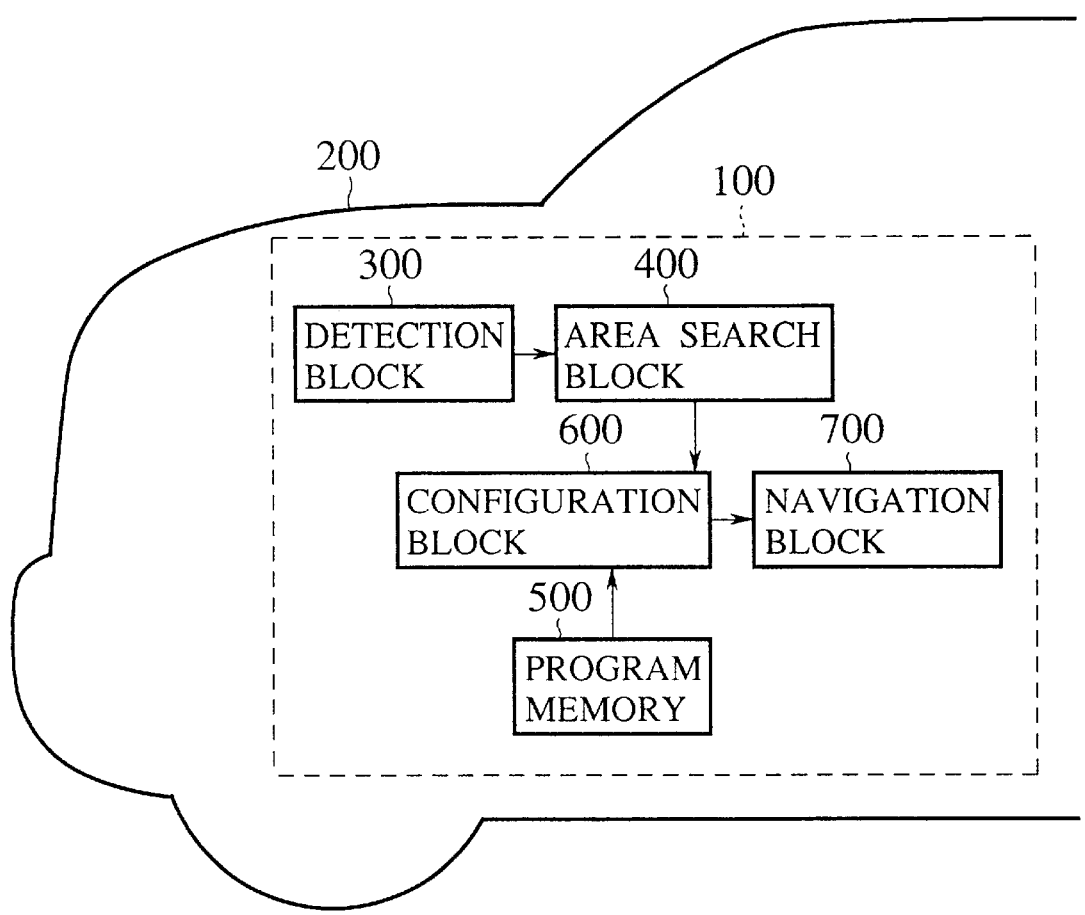
FIG. 1 is a block diagram of a navigation and positioning system for a vehicle according to a first preferred embodiment of the present invention.

Referring now to the drawings, wherein like numerals indicate like parts, and initially to FIG. 1, there will be seen a block diagram showing a navigation and positioning system 100 boarded on a vehicle 200, that comprises a first preferred embodiment of the present invention.

A detection block 300 detects the position of the vehicle 200. The detection block 300 is connected to an area search block 400. The area search block 400 determines the area in which the vehicle 200 is located. The area is defined by a range where a rule as to the navigation function is enforced.

A program memory 500 stores at least one program which is based on a rule as to a navigation function enforced an area.

The area search block 400 and the program memory 500 are connected to a configuration block 600. The configuration block 600 selects a program stored in the program memory 500 which corresponds to the area determined by the area search block 400.

The configuration block 600 is connected to a navigation block 700, and provides the program that corresponds to the determined area to the navigation block 700.

The navigation block 700 provides navigation to the user according to the program configured by the configuration block 600.

Therefore, the navigation and positioning system 100 functions in accordance with the rule enforced in the area where the vehicle 200 is located.

Figure 2:
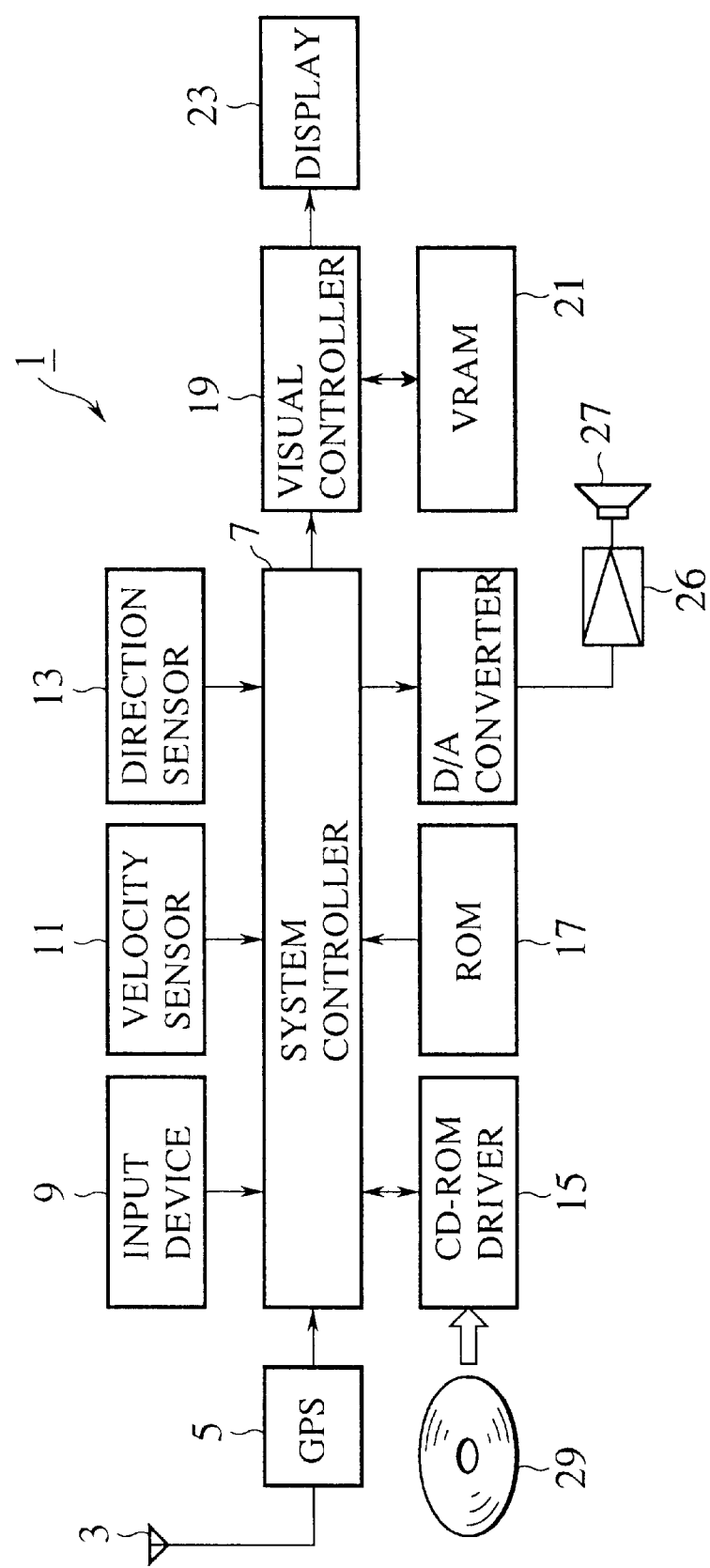
FIG. 2 is a block diagram of a navigation and positioning system for a vehicle according to a second preferred embodiment of the present invention.

FIG. 2 shows a block diagram of a navigation and positioning system of a second preferred embodiment of the invention, which is boarded on a vehicle.

A global positioning system (hereinafter referred as to GPS) 5 detects the position and the direction of the vehicle. An antenna 3 receives radio waves transmitted by several satellites (not shown) and sends these signals to the GPS 5. The GPS 5 calculates the position of the vehicle in the form of latitude and longitude. The position calculated by the GPS 5 is sent to a system controller 7.

The system controller 7 controls the navigation and positioning system 1 according to the program stored in a read only memory (hereinafter referred as to ROM) 17.

An input device 9 is operated by a driver/passenger in order to input the data for a destination to the system controller 7 to facilitate a search for a proper course or route of travel. The input device 9 may comprise a remote controller, a touch panel disposed on the surface of a display 23, and/or switches disposed on the instrument panel inside the vehicle, etc.

A velocity sensor 11 detects the velocity of the vehicle. The velocity sensor 11 includes an encoder (not shown) disposed in the transmission, which generates pulses corresponding to the revolutions of the vehicle's axle, and the velocity sensor 11 counts the number of the pulses, and sends the signal to the system controller 7.

A direction sensor 13 detects the direction of the progress of the vehicle using a geomagnetic sensor, a gyroscope, or an opt-gyroscope. The signal generated by the direction sensor 13 is sent to the system controller 7.

The ROM 17 stores the programs and the data sufficient to adjust the operation of the system controller 7, to comply with all of the rules enforced as to navigation systems in the United States.

A display 23, composed by a liquid crystal display, or a CRT (cathode ray tube), or any other convenient display, is placed inside the vehicle so that it indicates the navigation information to the driver/passenger.

A visual random access memory (hereinafter referred as to VRAM) 21 stores and outputs various data to be indicated on the display 23 processed by the system controller 7.

The visual controller 19 controls indications on the display 23. The visual controller 19 stores the several kinds of data outputted from system controller 7 into the VRAM 21 temporarily and retrieves them to be processed with a same scale.

A digital/analogue converter (hereinafter referred to as D/A converter) 25 decodes digital voice data, originally stored in the ROM 17. An amplifier 26 amplifies the analogue voice data and makes a predetermined voice message corresponding to a certain situation through a speaker 27.

A CD-ROM driver 15 provides the capability to read the data stored in CD-ROM 29. The CD-ROM driver 15 transmits data stored in the CD-ROM 29 to the system controller 7 with either a parallel or a serial communication method.

The CD-ROM 29 stores map data, area data, rule data, etc. The map data includes data representing cities, towns, roads, railways, facilities, etc. in several areas, their locations, and the text data to indicate their names on the display. It can also include data showing restrictions for traffic (for example, one-way, no-turn, road-closed) on some roads or intersections.

The area data includes codewords designating each area where a rule regulates the function of the navigation system 1. The area data also includes the location and border of each area.

The locations of the map data and the area data may be stored, by way of example, in the form of combinations of latitude and longitude or in the form of map coordinates which is, for example, defined by the latitude and longitude in a certain distance.

Figure 3A:
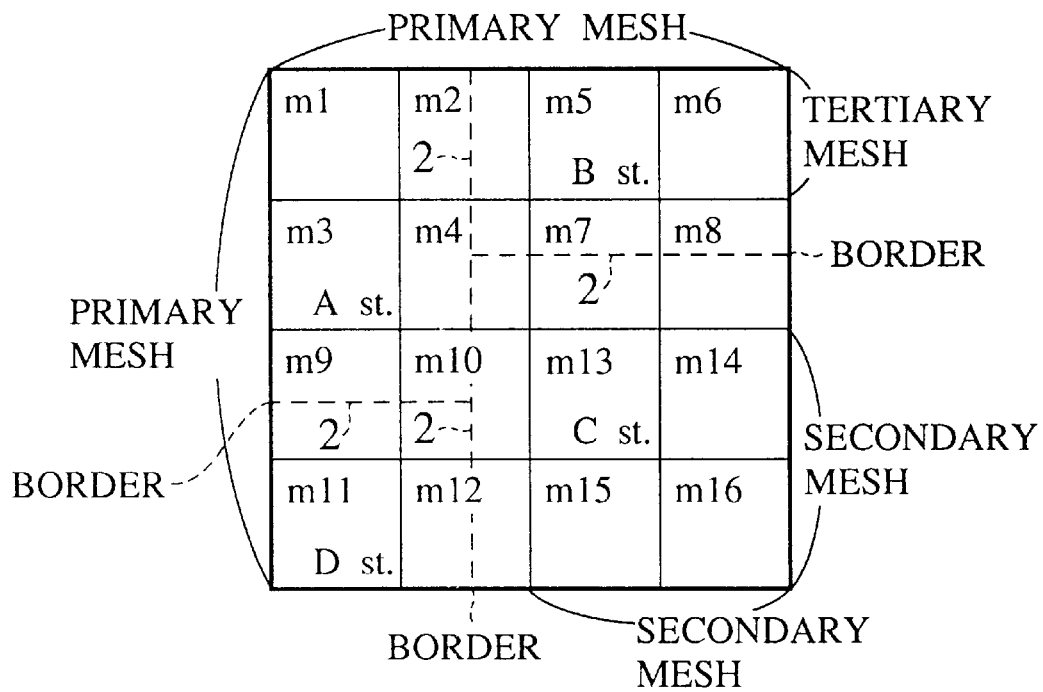
FIG. 3A is a schematic chart of a primary mesh of map data and area data according to the second preferred embodiment of the present invention.
Figure 3B:
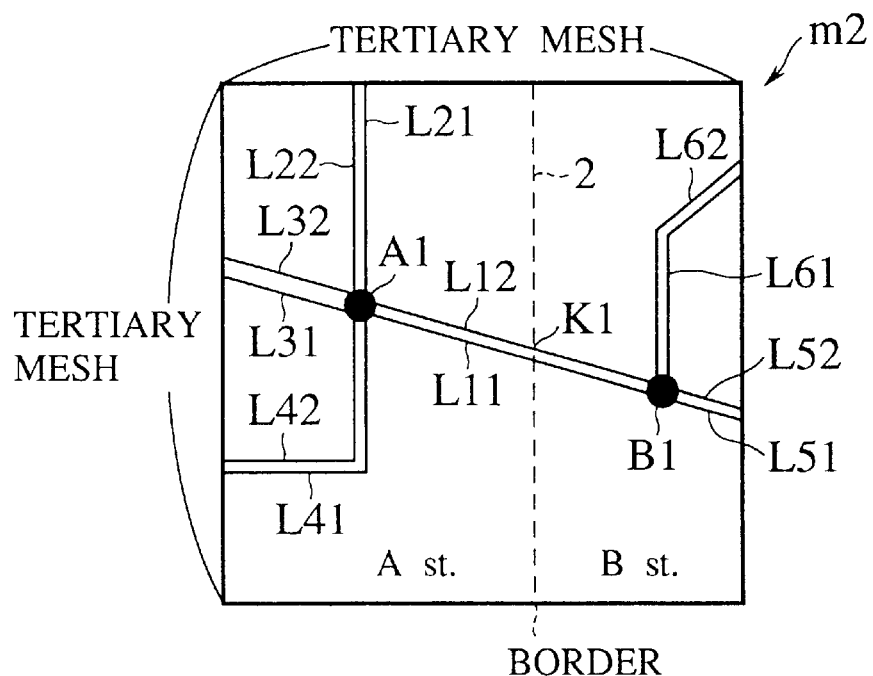
FIG. 3B is a schematic chart of a tertiary mesh of map data and area data according to the second preferred embodiment of the present invention.

Referring to FIG. 3A and FIG. 3B, map data stored in the CD-ROM 29 covers several areas with plural divisions. The borders for these areas are indicated by dashed-lines 2. The biggest division is called a primary mesh, comprising the entire area of the block shown in FIG. 3A. A primary mesh is divided into four secondary meshes, referred to as m1–m4, m5–m8, m9–m12, and m13–m16. A secondary mesh is further divided into four tertiary meshes, referred to as m1, m2, m3 . . . , and m16. Each division is defined by a couple of lines showing the longitude and by a couple of lines showing the latitude, which have the same distance to each other.

A primary mesh corresponds, for example, to dozens kilometers, and a tertiary mesh corresponds to dozens or hundreds of meters. A map is indicated on the display 23 as a division or as a combination of preferred numbers of the divisions according to a desired scale. Therefore, the size of each division is decided depending on each map or area.

Each division also stores area data, which shows a particular area or areas included in the division. For instance, the area data of the primary mesh stores four areas: the States of "A", "B", "C", and "D". A secondary mesh m1–m4, for example, stores parts of three areas: the States of "A", "B", and "C". Another secondary mesh m13–m16 stores one area represented by the State "C". The other secondary meshes stores the areas in the same way.

The area data corresponding to the tertiary meshes, such as m1, m3, m5, m6, etc., stores one area respectively, since each of these divisions belongs to only one state. Other tertiary meshes, such as m2, m4, m10, etc., store respectively plural areas.

FIG. 3B illustrates the map data and the area data of a tertiary mesh m2 which extends into 2 areas, or states. The map data includes nodes A1 and B1 and link L11 to L62. A node is a point shown by a location and usually represents an intersection, like nodes A1 and B1, but some nodes represent a point between intersections.

A link represents one direction of travel between two points on a road, of which both points are defined by two nodes. A pair of links, such as L11 and L12, or L21 and L22, represent the same road but opposite directions of travel thereon, respectively. The links also have image data, respectively, to be indicated as roads on the display. The placement of a road on the display depends upon the locations of the nodes on the both ends.

The links in the tertiary mesh have area data associated and stored therewith. In other words, the area data of the links L21 to L42, which are located within the area of the "A" State in the tertiary mesh m2, stores the "A" State. Similarly, the area data of the links L51 to L62 stores the "B" State.

The links L11 and L12 are located both in the "A" and "B" States. The point K1 represents the location of the border between the States "A" and "B" on the link L11 and L12.

The link L11 corresponds to the lane with the direction from the node A1 to B1, and stores the location of the point K1 and area data which shows the "A" State in front of the point K1 and the "B" State beyond the point K1. The link L12 corresponds to the opposite lane of the link L11, and stores the location of the point K1, also, and area data which shows the "A" State beyond the point K1 and the "B" State in front of the pint K1.

The rule data stored in the CD-ROM 29 includes codewords representing the areas corresponding to the area data, and also the codewords representing the programs which control the system controller 7 to obey the rules being enforced in each area as to navigation functions.

FIG. 4 shows a sample of contents of rules as to navigation functions in several areas. In this example, four different rules are enforced in four different States—the States of A, B, C, and D, and are regulating the four functions of the navigation and positioning system 1—operation, map indication, direction, and voice message.

The operation function allows the user to input the information, such as the destination, with the input device 9. The inputted information is necessary for plotting the proper course or route to travel. This function makes system controller 7 indicate menus or a map on the display 23 in order to help the user to input the information.

With the map indication function, the system controller 7 indicates on the display 23 the map with cities, towns, roads, railways, facilities, their names, restrictions, etc. according to the map data.

The direction function modifies information to the above-mentioned map. In other words, it is included to add the information, such as position of the vehicle, the direction of progress, the course from the departure point to the current position, the proper course to the destination, and an enlarged image of intersections and an indication of which way to take at an intersection. The direction function also may include an indication of the information received by a traffic information receiver, such as a temporary restriction on the traffic, the location of an accident, a place under road construction, sections with heavy traffic and the amount of the traffic.

Moreover, prompting the direction with arrows at the intersection, or erasing the letters on the map while the vehicle is moving are also parts of the direction function.

The voice message function offers information to the user with sound. The sound is usually a pre-recorded voice prompt as to the direction at an intersection and/or telling the arrival to the destination, etc.

Referring to FIG. 4, in the "A" State, at first, the rule prohibits none of the four functions of the navigation system 1. In the "B" State, operation by the user inputting data is prohibited when the vehicle is moving, but map indication, direction, and voice message are permitted. In the "C" State, operation during the vehicle's moving and map indication are prohibited, and direction and voice message are permitted. Finally, in the "D" State, all functions of the navigation system 1 are prohibited, except when the vehicle is not moving, but voice message is permitted.

Based on these rules, the rule data stores codewords representing programs that may be run on the system controller 7 in order to follow the appropriate rule in each state. These programs are stored in the ROM 17.

Figure 5:
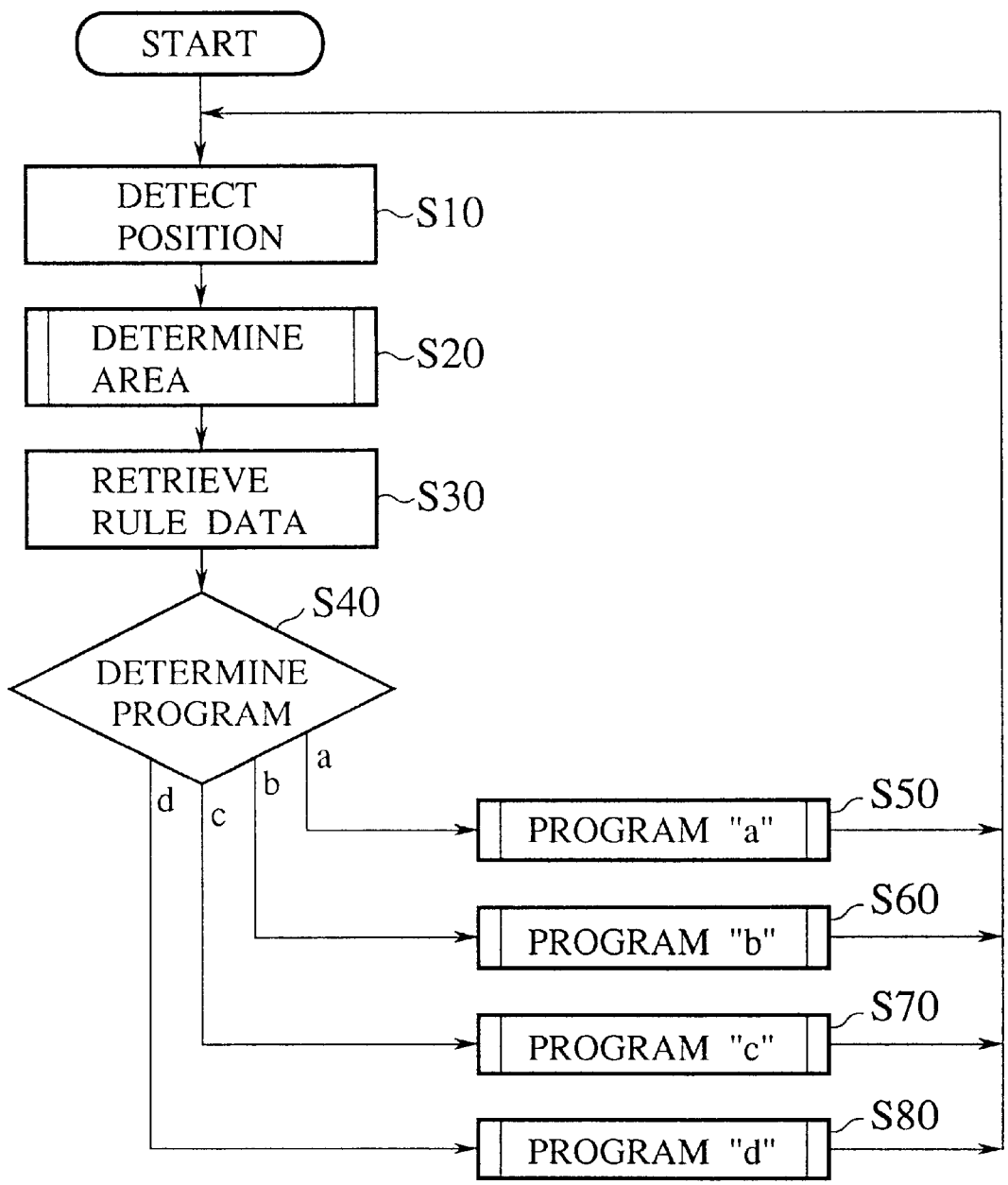
FIG. 5 is a flow-chart for controlling a navigation and positioning system for the vehicle according to the second preferred embodiment of the present invention.

Referring to FIG. 5, there is shown a flow-chart of a program for controlling a navigation and positioning system 1 for a vehicle. According to the flow-chart the system controller 7 configures the system with one of the programs "a" to "d". The system controller 7 processes the program stored in the ROM 17 embodying the flow-chart periodically, for example every 10 ms, measured by a timer disposed in the system controller 7.

In the beginning, at step S10 the position of the vehicle detected by the GPS 5, the velocity sensor 11, and/or the direction sensor 13 is retrieved into the system controller 7.

At step S20, the area in which the vehicle is located is determined based on the position of the vehicle detected at step S10 by referring to the map data and the area data stored in the CD-ROM 29 through the CD-ROM driver 15.

Figure 6:
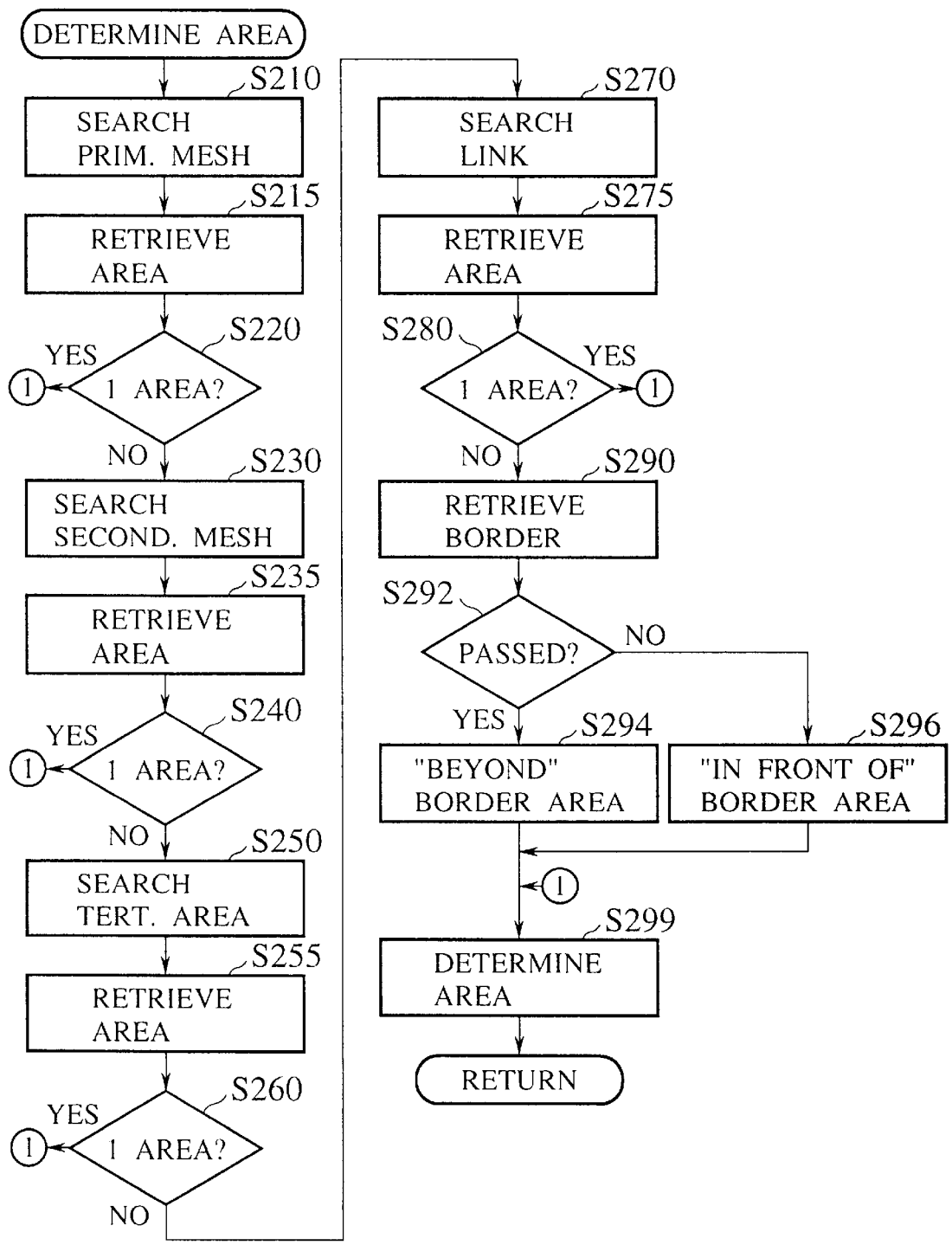
FIG. 6 is a flow-chart of a subroutine program for searching an area according to the second preferred embodiment of the present invention.

FIG. 6 shows the flow-chart of a subroutine program for determining the area in which the vehicle is located.

At step S210, the system controller 7 searches for the primary mesh which includes the position of the vehicle, by referring to the longitude and latitude surrounding the division. At the next step S215, one or more areas that overlap a portion of the particular primary mesh are retrieved according to the area data of the primary mesh, i.e., the States "A", "B", "C", or "D", searched at step S210.

At step S220, the number of areas retrieved at step S215 is counted. If only one area is counted ("YES"), then the program goes to step S299. At step S299, the retrieved area is distinguished as the area including the position of the vehicle, and then the subroutine returns to the flow-chart of FIG. 5.

If more than one retrieved area is counted ("NO") at step S220 (when the vehicle, for instance, is positioned within the primary mesh shown in FIG. 3A), then the next step S230 is provided.

At step S230, the four secondary meshes in the primary mesh determined at step S210 are searched and one division is determined which includes the position of the vehicle. At step S235, one or more areas that belongs to the secondary mesh are retrieved according to the area data of the secondary mesh.

At step S240, the number of areas retrieved at step S235 is counted. If only one area is counted ("YES"), (when the vehicle, for instance, is in the secondary mesh referred as m13–m16 in FIG. 3A), then step S299 is provided and the area including the position of the vehicle is determined. If more than one area is counted ("NO") at step S240 (when the vehicle, for instance, exists in the secondary mesh referred as m1–m4, m5–m8, or m9–m12 in FIG. 3A), then the next step S250 is provided.

At step S250, the four tertiary meshes in the secondary mesh determined at step S230 are searched and it is determined which one division includes the position of the vehicle. At step S255, one or more areas that overlap to the tertiary mesh are retrieved according to the area data of this division.

At step S260, the number of areas retrieved at step S255 is counted. If only one area is counted ("YES"), (when the vehicle, for instance, is in the tertiary mesh referred as m1, m3, or m5 etc. in FIG. 3A), then program goes to step S299 and the area including the position of the vehicle is determined. If plural areas are counted ("NO") at step S260 (when the vehicle, for instance, is positioned in the tertiary mesh referred to as m2, m4, m7 etc. in FIG. 3A), then the next step S270 is provided.

At step S270, the links in the tertiary mesh determined at step S250 are searched and one link is determined on which the vehicle is positioned. The link is determined by determining the node which the vehicle has passed by comparing the position of the vehicle and the locations of the nodes, and by the direction of progress of the vehicle on the node which the vehicle passed.

At step S275, one or more areas that the link is spread on are retrieved according to the area data of this link.

At step S280, the number of areas retrieved at step S255 is counted. If only one area is counted ("YES"), (when the vehicle, for instance, is on one of the links referred as L21–L62 in FIG. 3B), then the program goes to step S299 and the area including the position of the vehicle is determined. If more than one area is counted ("NO") at step S280 (when the vehicle, for instance, is positioned on the link L11 or L12 in FIG. 3B), then the next step S290 is provided.

At step S290, the location of the border, such as the point K1 of FIG. 3B, is retrieved. At the next step S292, it is inquired whether the vehicle has passed the border or not. If the vehicle has passed the border ("YES"), then step S294 is provided, and the area beyond the border is retrieved. If the vehicle has not passed the border yet ("NO" in step S292), then the step S296 is provided, and the area in front of the border is retrieved.

After step S294 or S296 is processed, step S299 is provided, and the area including the position of the vehicle is distinguished.

Accordingly, if the division including the position of the vehicle belongs to one area, that area is determined as the area where the vehicle exists. Otherwise, the area is determined according to the link. Therefore, the process for determining the area is simplified and faster.

Referring to FIG. 5 again, at step S30, the rule data stored in CD-ROM 29 is retrieved. At the next step S40, according to the rule data and the area decided at step S20, one of the programs stored in the ROM 17 is selected.

Thus, one of the subroutine programs "a", "b", "c", and "d" is run at one of the steps S50, S60, S70, and S80. For instance, when it is determined that the vehicle is in the "A" State, the program "a" at step S50 is processed.

The programs "a", "b", "c", and "d" are shown in FIG. 7A through FIG. 7D.

Figure 7A:
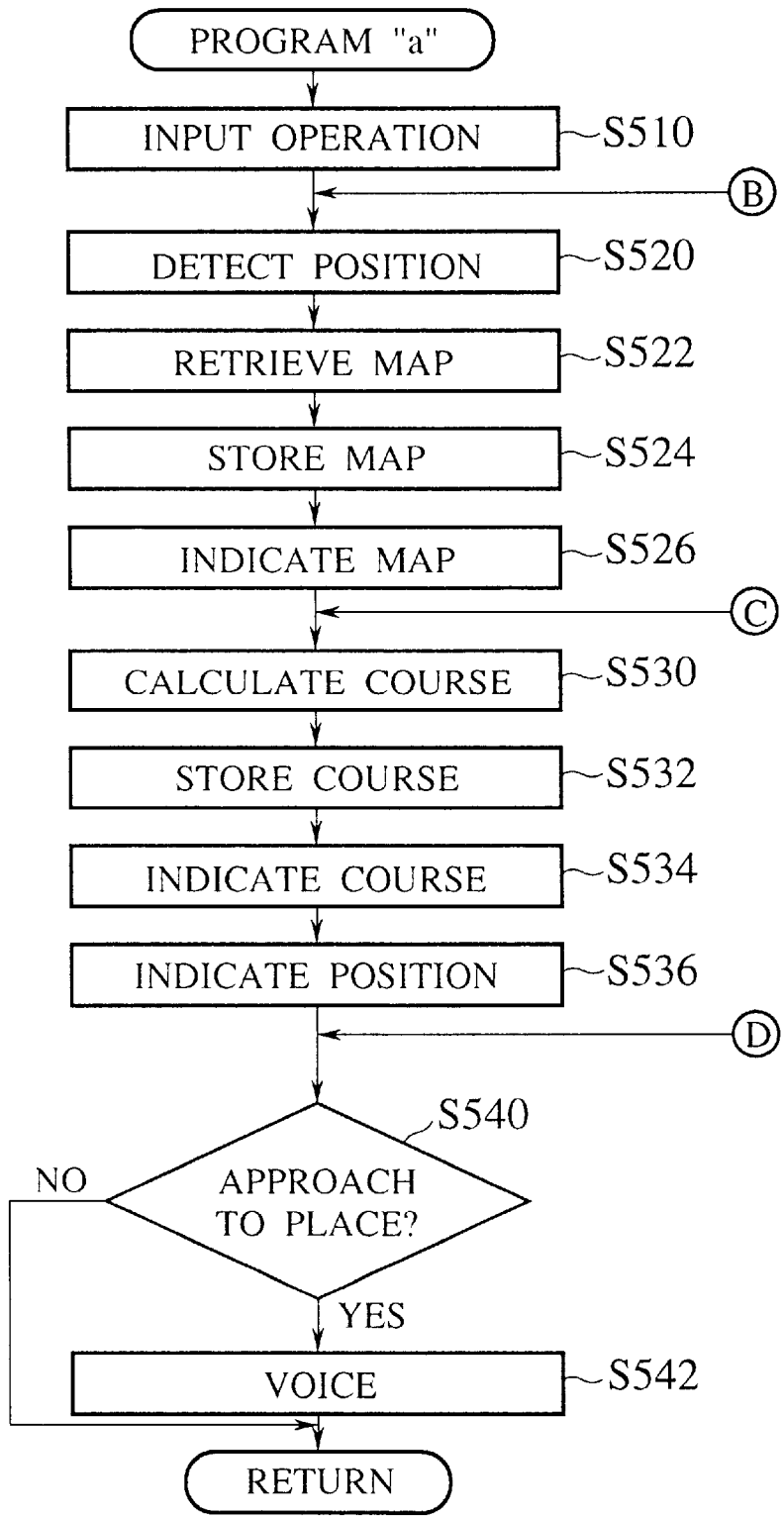
FIG. 7A to 7D are flow-charts of subroutine programs according to the second preferred embodiment of the present invention.

The program "a" shown in FIG. 7A makes the system controller 7 function obey the rule as to the navigation system enforced in the State of "A".

At step 510, the operation function is performed. The system controller 7 receives the signals from the input device 9 operated by a user, and, responding to the signals, indicates a map or menu on the display 23 so that the driver/passenger can input the destination.

Steps S520 through S526 perform the map indication function.

At step S520 the position of the vehicle is detected by the GPS 5 and/or the velocity sensor 11 and the direction sensor 13. At step S522, the map data stored in the CD-ROM 29 is searched and the map including the vehicle position is retrieved. At step S524, the map data is stored in the VRAM 21 through the visual controller 19.

At step S526, the map data is retrieved from the VRAM 21, is processed to put it into a certain scale and direction, and is indicated on the display 23.

Steps S530 through S536 perform the direction function.

At step S530, based on the position of the vehicle (or the departure point inputted through the input device 9) and the destination inputted by the user at step S510, the proper course, i.e. the shortest course in distance or time, is calculated by searching the nodes or links under the well known Dykstra Method.

At step S532, the proper course is stored in the VRAM 21 through the visual controller 19. At step S534, the course is retrieved from the VRAM 21 and superimposed on the map in the display 23 at the same scale.

At step S536, the position of the vehicle and the direction of progress are indicated with a marker on the map, according to the signal from the GPS 5, the velocity sensor 11, and the direction sensor 13.

In addition, other direction information, as known, can be indicated, i.e., the course from the departure point to the current position, an enlarged image of an intersection and an indication as to which way to take at an intersection, the information received by a traffic information receiver, a prompt of the direction with arrows at the intersection, or erasing the letters on the map.

Steps S540 through S542 perform the direction function.

At step S540, according to the vehicle position, the map data, and the proper course, it is inquired whether the vehicle is at the place for a predetermined message, such as within a range (for example, 500 meters) of the intersection to make a turn, or of the destination. If the vehicle is at the place ("Yes" is obtained at step S540), then the program goes to step S542.

At step S542, one of the data for a voice message is retrieved from the ROM 17, and transmitted to the D/A converter 25 with a certain speed for the user to listen to. Therefore, the speaker 27 provides the user the voice message.

After the step S542 is processed or the vehicle is not at the place yet ("No" is obtained at step S540), this subroutine returns to the main program shown in FIG. 5.

Thus, all of the functions of the navigation system 1, i.e., the operation, the map indication, direction, and voice message, are performed by the program "a", which is configured in the "A" State.

Figure 7B:
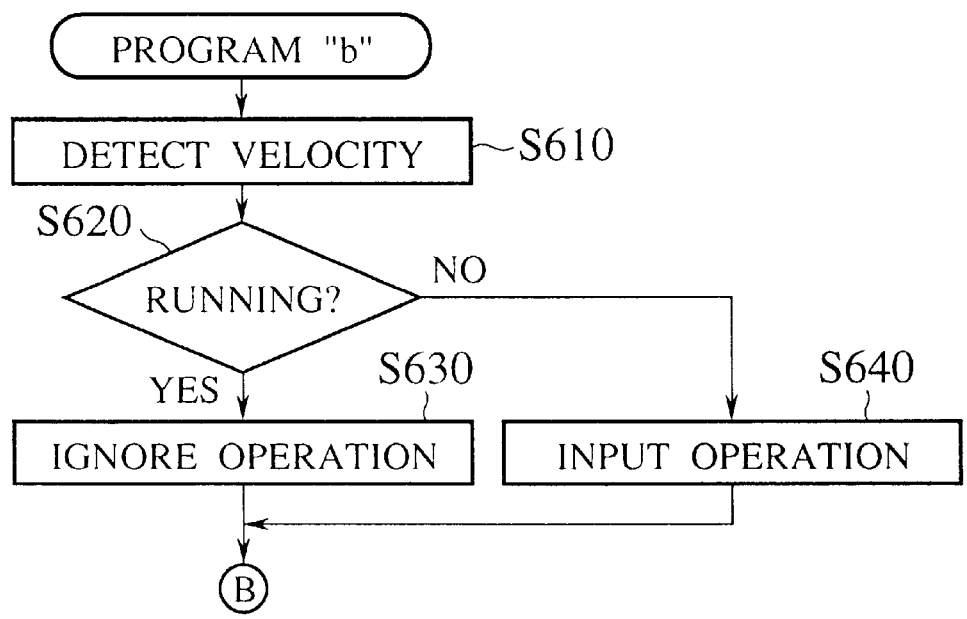

The program "b" shown in FIG. 7B makes the system controller 7 function obey the rule as to the navigation system enforced in the State of "B", where the operation by the user is prohibited when the vehicle is moving, and map indication, direction, and voice message are permitted.

At step S610, the velocity of the vehicle is detected by the velocity sensor 11.

At step S620, it is inquired whether the vehicle is moving. If the vehicle is moving, i.e., for instance, the velocity is 2 M.P.H. or more ("YES" is obtained), then the step S630 is provided. If the vehicle is stopping, i.e., for instance, the velocity is under 2 M.P.H. ("NO" is obtained), then the step S640 is provided.

At step S630, the system controller 7 ignores the signal from the input device 9. Accordingly, the system controller 7 does not respond to the operations of the input device 9.

At step S640, in the same way as step S510, the system controller 7 receives the signals from the input device 9, and indicates a map or menu for the user's operation.

After step S630 or S640, step S520 of FIG. 7A is provided, and the steps following the step S520 are processed.

Thus, when the vehicle is moving, the operation of the input device 9 is not available. On the other hand, when the vehicle is not moving, the operation is available. Furthermore, the functions of the map indication, direction, and the voice message are available by the program "b" which is configured in the "B" State.

Figure 7C:
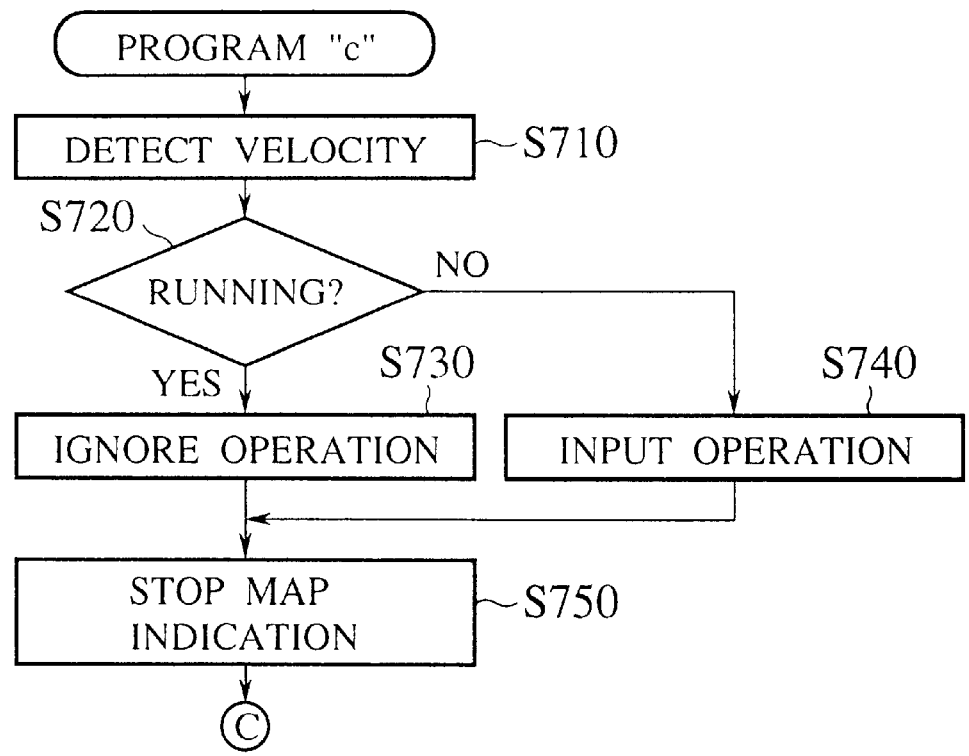

The program "c" shown in FIG. 7C makes the system controller 7 obey the rule as to the navigation system enforced in the State of "C", where the operation by the user when the vehicle is moving and map indication are prohibited, while direction and voice message are permitted.

Steps S710 through S740 are the same steps as the steps from S610 through S640 in the FIG. 7B.

At step S750, the visual controller 19 stops sending the data for the map stored in the VRAM 21 to the display 23. Next, step S530 of the FIG. 7A is provided and the following steps are processed.

Thus, the operation of the input device 9 is not available while the vehicle is moving, and the map is not indicated on the display 23. On the other hand, the operation is available while the vehicle is stopped. The direction without map (displaying only the course or arrow), and the voice message are available by the program "c" while the vehicle is moving in the "C" State.

Figure 7D:
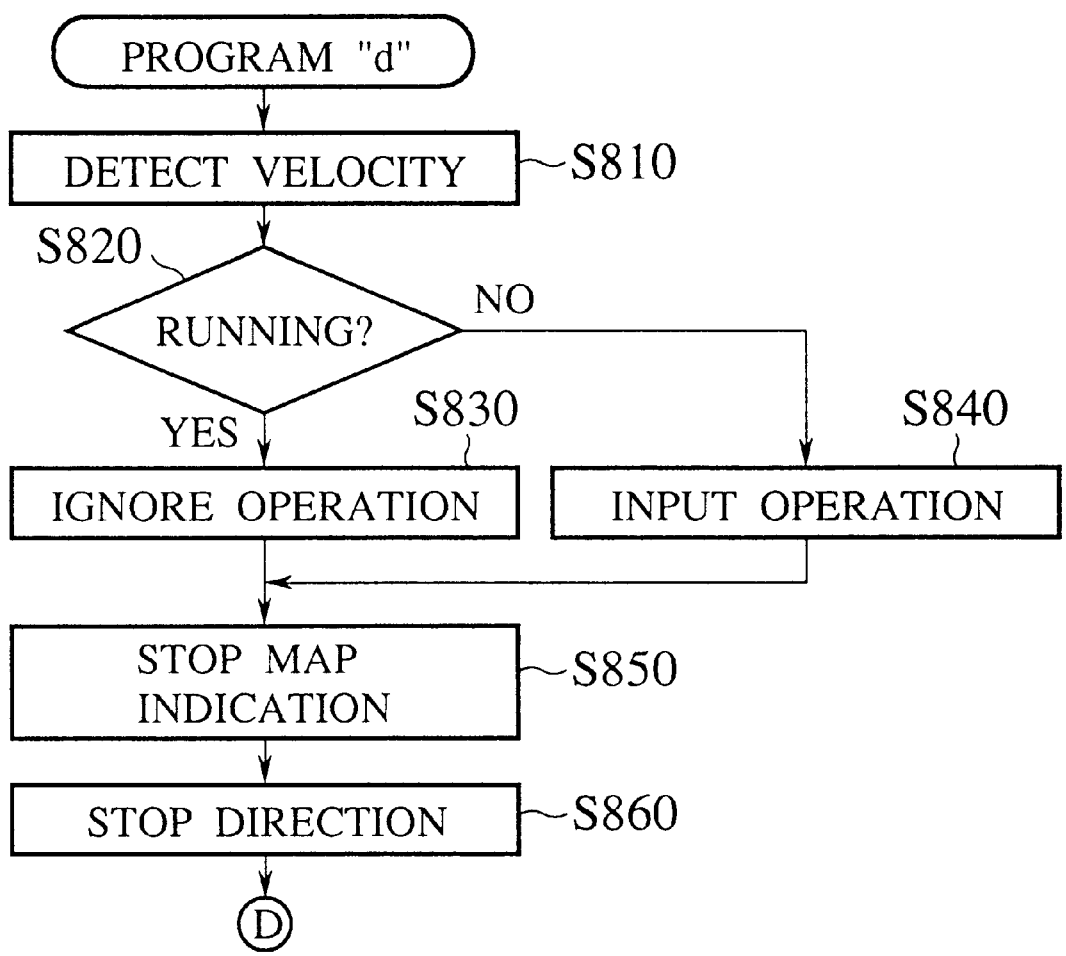

The program "d" shown in FIG. 7D makes the system controller 7 obey the rule as to the navigation system enforced in the State of "D", where the operation by the user while the vehicle is moving is prohibited, and map indication and direction are always prohibited. Only operation while the vehicle is stopped is permitted. Voice message is permitted all the time.

Steps S810 through S840 are the same steps as the steps from S610 through S640 in FIG. 7B, and step S850 is the same step as the step S750 in FIG. 7C.

At step S860, the visual controller 19 stops sending the data for the direction stored in the VRAM 21 to the display 23. Next, step S540 of FIG. 7A is provided and the following steps are processed.

Thus, the operation of the input device 9 is not available while the vehicle is moving, and neither the map or direction is indicated on the display 23. On the other hand, the operation is available while the vehicle is stopping, and the voice message is available in the "D" State.

The association of a codeword with each area on the map, in a rule data, significantly increase the efficiency of the system because it allows different programs to be loaded quickly as the vehicle moves into new areas.

Figure 8:
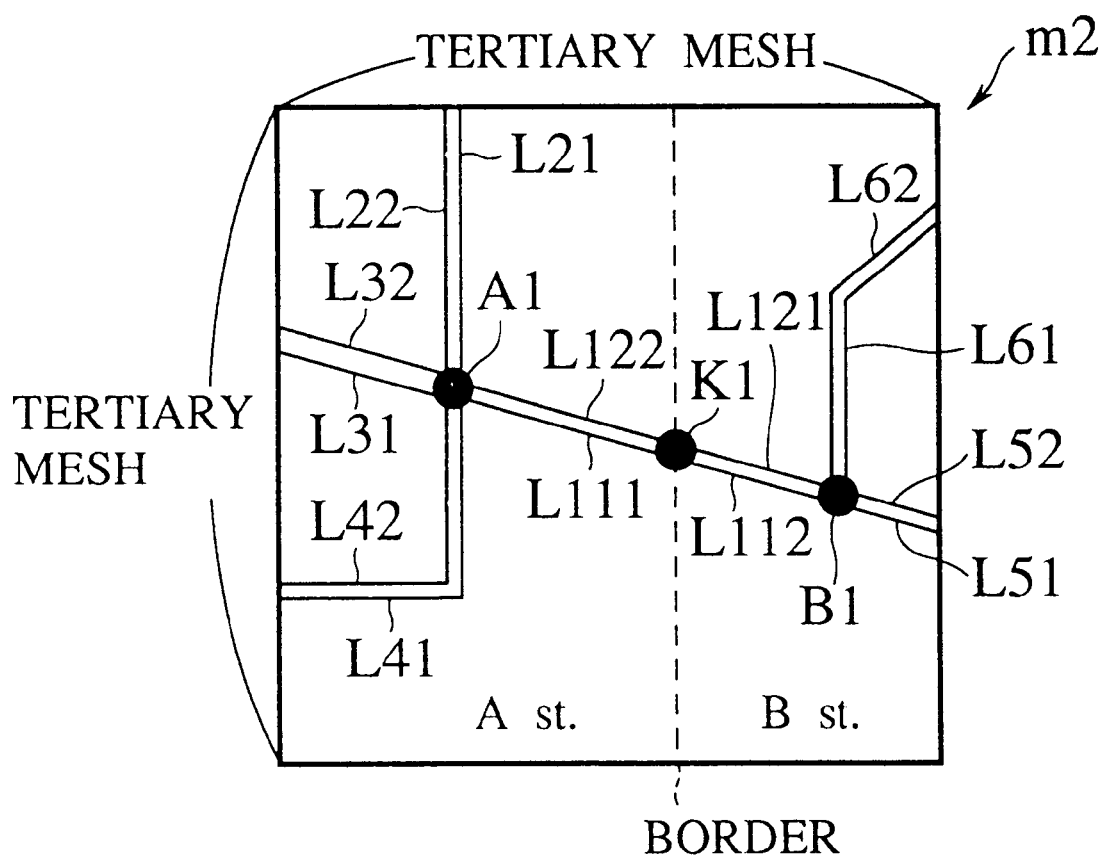
FIG. 8 is a schematic chart of a tertiary mesh of alternative map data and area data for the second preferred embodiment of the present invention.

FIG. 8 shows a tertiary mesh of the map data and the area data used alternatively for those in FIG. 3B. In FIG. 3B, the link L11 and L12 covering both the States "A" and "B" stores the location of the border K1 and the two areas in association therewith.

In FIG. 8, K1 is a node whose location represents the border of the States. Links L111 and L122 between the nodes A1 and K1 store only the "A" State in the area data. Links L112 and L121 between the nodes B1 and K1 store only the "B" State in the area data.

Accordingly, when the area including the position of the vehicle is determined, the steps S280 through S296 of the flow-chart shown in the FIG. 6 can be omitted. Therefore, the process is simplified.

Figure 9:
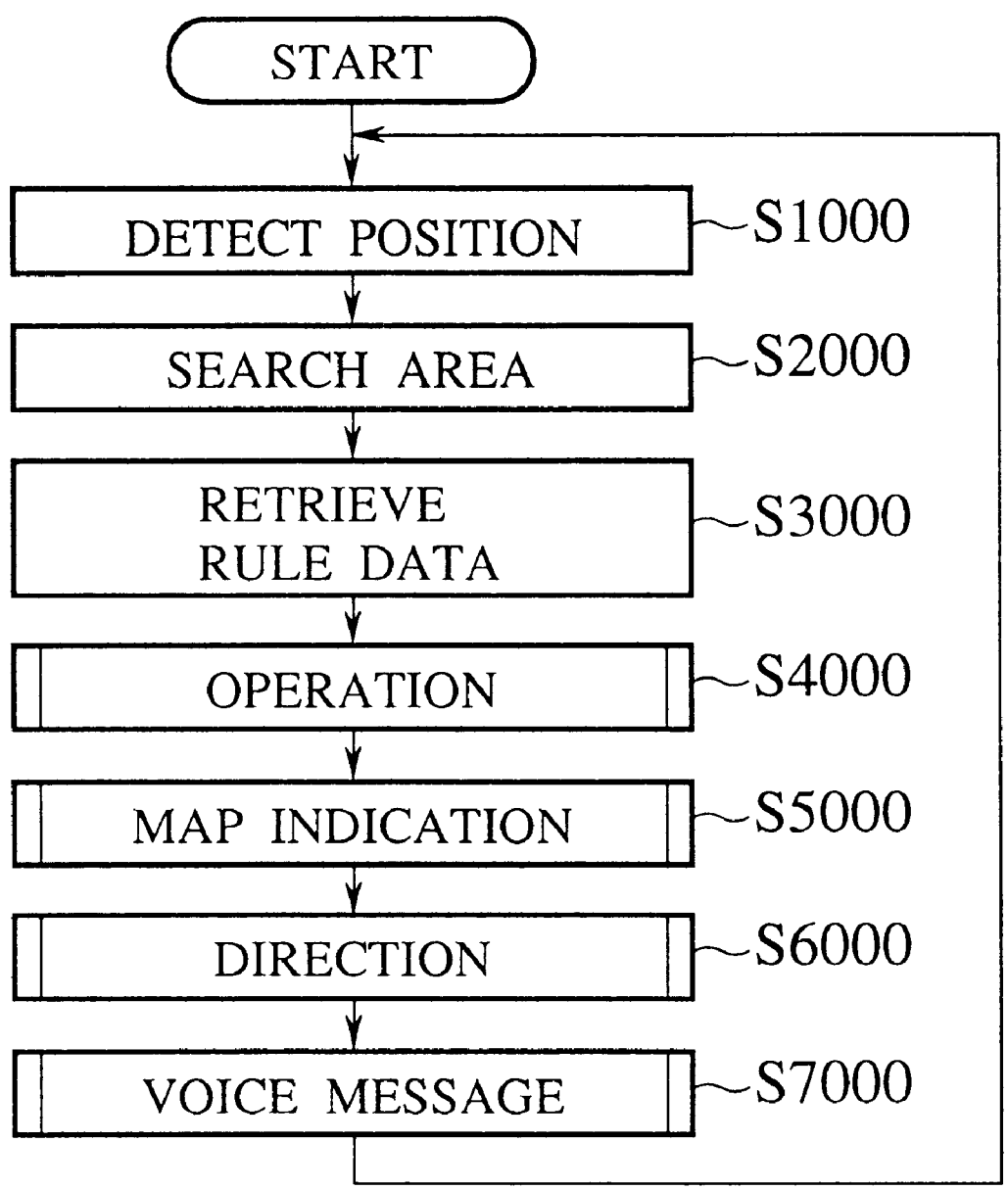
FIG. 9 is a flow-chart for controlling a navigation and positioning system for the vehicle according to a third preferred embodiment of the present invention.

FIG. 9 illustrates a third embodiment of the preferred invention. In the second embodiment, a program corresponding to an area is configured. In this embodiment, the subroutine programs corresponding to both an area and the functions are configured. The structure of the navigation and positioning system of this embodiment is the same as shown in FIG. 2.

The flow-chart shown in FIG. 9 is stored in the ROM 17 of FIG. 2, and run on the system controller 7.

At step S1000, the position of the vehicle is detected in the same way as at step S10 in FIG. 5. At step S2000, the area including the position of the vehicle is searched in the same way as at step S20 in FIG. 5 and its subroutine shown in FIG. 6.

At step S3000, the rule data stored in CD-ROM 29 is retrieved. At the next step S4000, according to the rule data, one of the subroutine programs stored in the ROM 17 is configured. The configured subroutine program controls the operation function obeying the rule embodied in the area searched at step S2000.

At steps S5000 to S7000, subroutine programs are run corresponding to the area and the function for map indication, direction, and voice message, respectively.

Referring to FIG. 10, in the "A" State, the rule prohibits none of the four functions—operation, map indication, direction, and voice message—of the navigation system 1. Accordingly, the program "e" for operation, the program "g" for map indication, the program "i" for direction, and the program "k" for voice message are selected.

Next, in the "B" State the operation by the user is prohibited when the vehicle is moving, but map indication, direction, and voice message are permitted. Accordingly, the program "f" is configured for operation, and the programs "g", "i", and "k" are configured for the other functions as in the State of "A".

In the "C" State operation during vehicle movement, and map indication are prohibited, while direction and voice message are permitted. Accordingly, the program "f" for operation, and the programs "h" for map indication are selected, and programs "i" and "k" are selected for direction and voice message, respectively.

Finally, in the "D" State all functions of the navigation system 1 are prohibited except operation on stopping and the voice message. Accordingly, the same programs are configured as in the "C" State except the program "j" for direction.

FIG. 11A through FIG. 11G shows the subroutine programs "e" through "k", respectively.

Figure 11A:
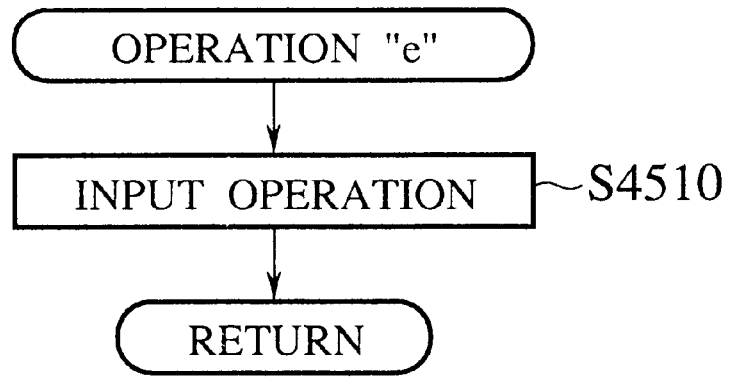
FIGS. 11A through 11G are flow-charts of subroutine programs for the functions of the navigation and positioning system according to the third preferred embodiment of the present invention.

Referring to FIG. 11A, the program "e" is one of the subroutines of the step S4000 in FIG. 9. At step S4510, when the system controller 7 receives the signals from the input device 9 operated by a user, it responds to the signals, as at step 510 in FIG. 7A.

Figure 11B:
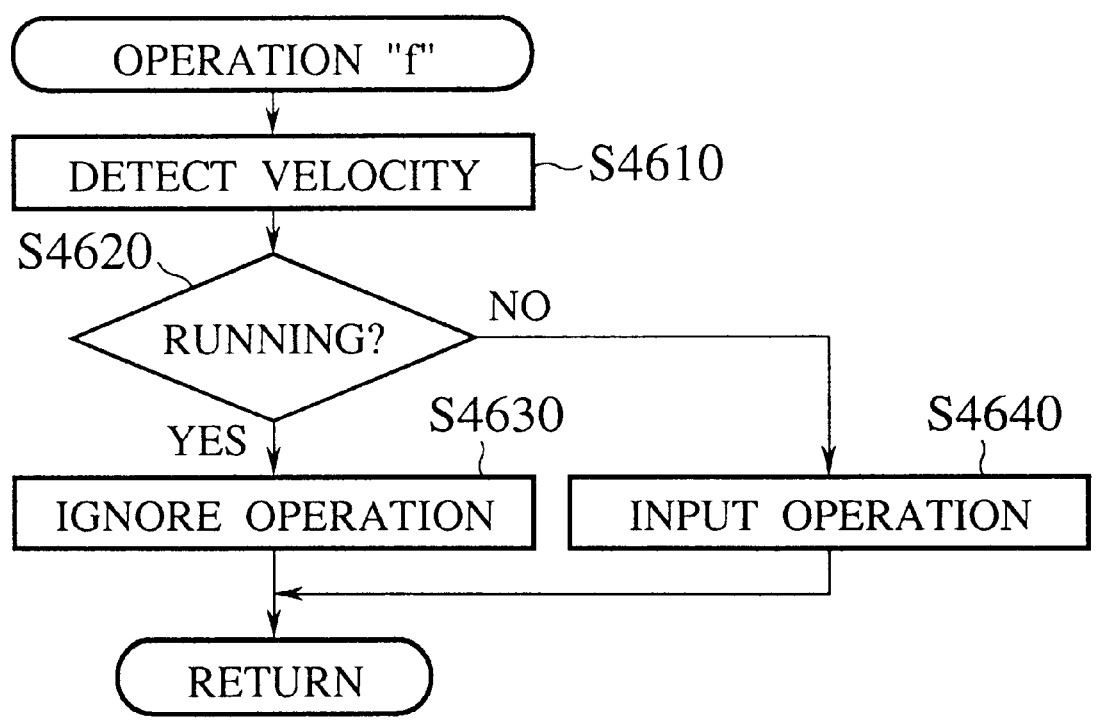

Referring to FIG. 11B, the program "f" is one of the subroutines of the step S4000 in FIG. 9. At steps S4610 through S4640, the system controller 7 performs in the same manner as at the steps S610 though S640 in FIG. 7B. Accordingly, when the vehicle is moving, the user cannot input signals through the input device 9, and when the vehicle is stopped, users can provide inputs to the system.

Figure 11C:
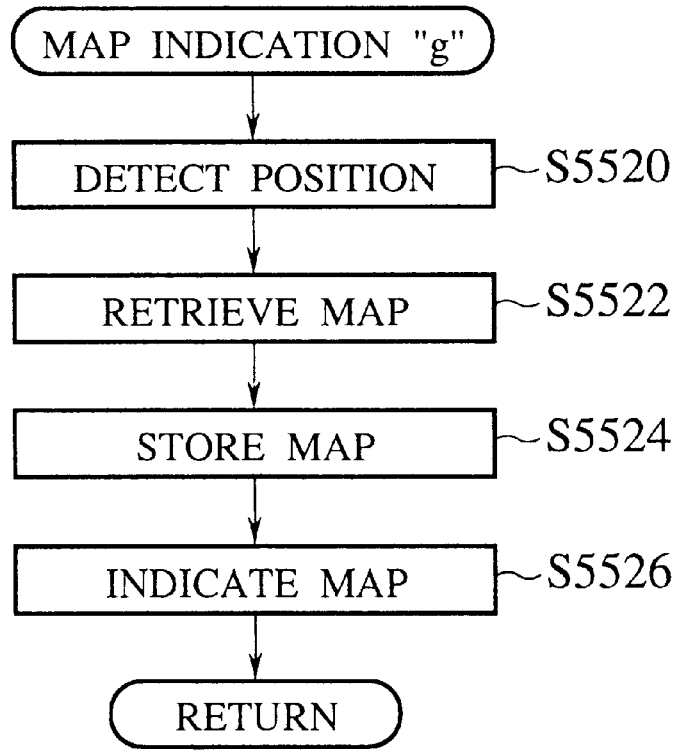

Referring to FIG. 11C, the program "g" is one of the subroutines of the step S5000 in FIG. 9. Steps S5520 through S5526 are the same as the steps S520 through S526 in FIG. 7A. Accordingly, the position of the vehicle is detected, and the map including the vehicle position is indicated on the display 23.

Figure 11D:
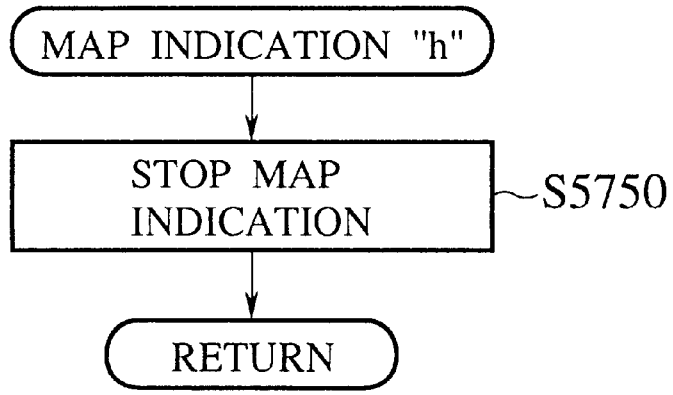

Referring to FIG. 11D, the program "h" is one of the subroutines of the step S5000 in FIG. 9. Step S5750 is the same as the step S750 in FIG. 7C. Accordingly, the map indication is stopped.

Figure 11E:
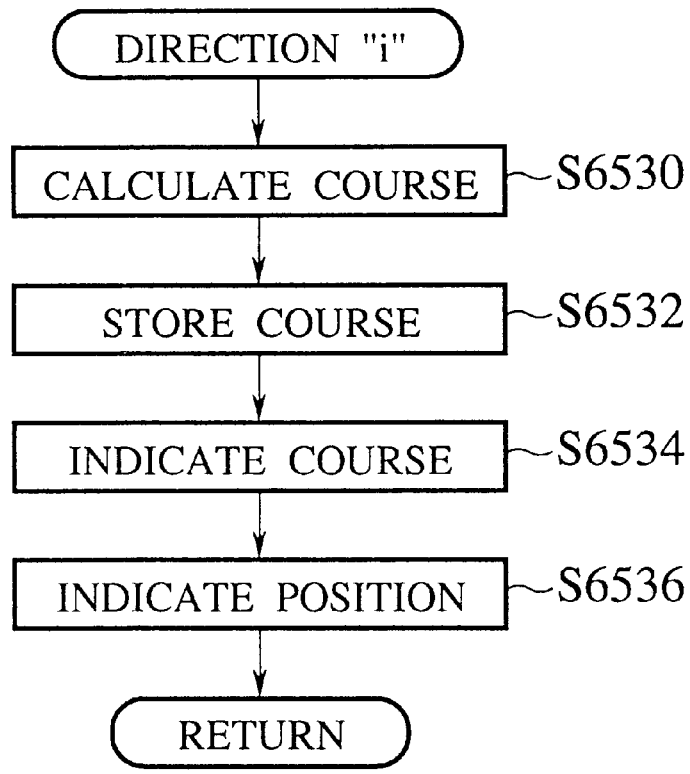

Referring to FIG. 11E, the program "i" is one of the subroutines of the step S6000 in FIG. 9. Steps S6530 through S6536 are the same as the steps S530 through S536 in FIG. 7A. Accordingly, the proper course is calculated and indicated on the display 23, the position of the vehicle and the direction of progress are indicated on the map.

Figure 11F:
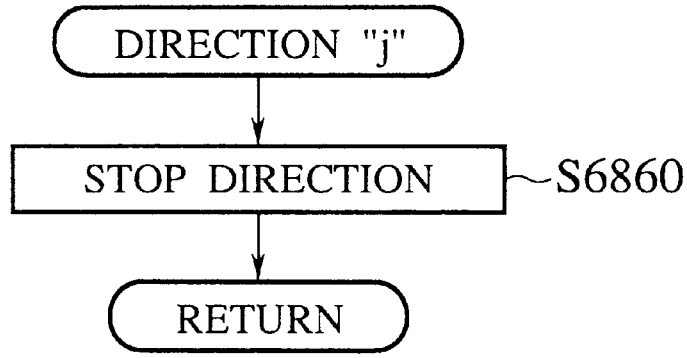

Referring to FIG. 11F, the program "j" is one of the subroutines of the step S6000 in FIG. 9. Step S6860 is same as the step S860 in FIG. 7D. Accordingly, the direction is stopped.

Figure 11G:
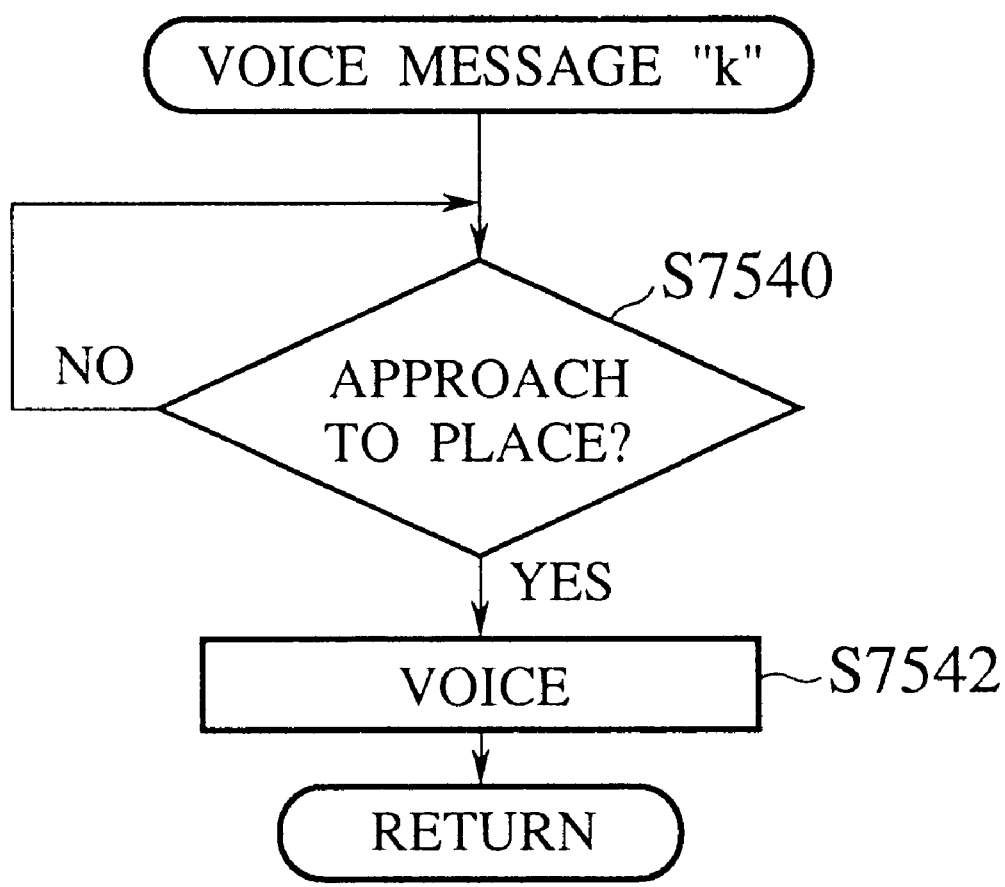

Referring to FIG. 11G, the program "k" is a subroutine of the step S7000 in FIG. 9. Steps S7540 and S7542 are the same as steps S540 and S542 in FIG. 7A. Therefore, according to the vehicle position, the map data, and the proper course, when the vehicle is close to the intersection to make a turn, the voice message is given to the user.

In this embodiment a program is stored corresponding to each function. Therefore, the capacity of the ROM 17 can be smaller than that of the second embodiment.

After reading and understanding the foregoing inventive navigation and positioning system, in conjunction with the drawings, it will be appreciated that several distinct advantages of the subject invention are obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A navigation and positioning system for a vehicle, comprising:

a programmable navigator to navigate a vehicle;

a detector to detect a vehicle position of said vehicle; and a configurer to load a program into said navigator that restricts at least one of (1) user input information accepted by said navigation and positioning system and (2) navigation information supplied to a user by said navigation and positioning system, depending on a navigation rule enforced at the position of said vehicle detected by said detector, said configurer operating to load said program based on the position of said vehicle detected by said detector.

2. The navigation and positioning system as defined in claim 1, further comprising:

a program memory to store a first program as said program, with said first program being based on a respective rule enforced in a first area;

an area searcher to determine whether the position of said vehicle is within said first area; and wherein said configurer loads said first program corresponding to said first area if the position of said vehicle is within said first area.

3. The navigation and positioning system as defined in claim 1, wherein:

said navigator has a plurality of navigation functions, with said functions being performed by a plurality of navigation function programs respectively, and further wherein said navigator is designed to switch navigation function programs based on the detected position of said vehicle.

4. The navigation and positioning system as defined in claim 1, further comprising:

a road memory to store said program, wherein said program provides information corresponding to a road;

a road searcher to determine whether said vehicle is located on said road; and wherein said configurer loads said program corresponding to said road.

5. The navigation and positioning system as defined in claim 2, further comprising:

an input device operated by a user of said vehicle to input a destination signal into said navigator; and wherein said first program restricts operation of said input device by said user based on a rule restricting said operation in said first area.

6. The navigation and positioning system as defined in claim 2, further comprising:

a display device to indicate navigation information to a user; and wherein said first program restricts display of said navigation information by said display based on a rule restricting said navigation in said first area.

7. The navigation and positioning system as defined in claim 2, further comprising:

a map memory to store a map representing an overall area; and wherein said area searcher is designed to determine the position of said vehicle on said map, with said map including said first area.

8. The navigation and positioning system as defined in claim 7, further comprising:

a display device to display said map to a user, with said map being retrieved from said map memory; and wherein said first program is designed to restrict the display of said map on said display device based on a rule restricting the display of the map in said first area.

9. The navigation and positioning system as defined in claim 7, wherein:

said map memory stores said map as a plurality of divisions, said divisions being formed by dividing said map;

wherein said map memory storing an area associated with each of said divisions; and wherein said area searcher determines the area associated with the division in which said vehicle is positioned.

10. The navigation and positioning system as defined in claim 7, wherein:

said map memory stores a plurality of links, each of said links respectively representing a road on said map, said map memory storing an area associated with each of said links; and wherein said area searcher determines the area associated with the link on which said vehicle is positioned.

11. The navigation and positioning system as defined in claim 10, wherein:

said map memory stores a location on said link showing a border between a plurality of said areas, said map memory storing an area corresponding to one side of said border on said link, and another area corresponding to another side of said border on said link; and wherein said area searcher determines whether said vehicle is positioned in said first area based on the position of said vehicle on said link in relation to the location of said border.

12. A computer program embodied on computer-readable medium for navigating a vehicle, comprising:

a command program to retrieve a position of a vehicle detected by a detector;

a subprogram to implement a rule controlling navigation functions of a navigator, said subprogram restricting at least one of (1) user input information accepted by said navigator and (2) navigation information supplied by said navigator to a vehicle user, depending on the rule enforced at the position of said vehicle detected by said detector,; and first code elements for loading said subprogram into said navigator.

13. The computer program as defined in claim 12, wherein:

the first code elements include an area search program to determine whether said position of said vehicle is located within the area in which said rule is enforced;

second code elements for associating said subprogram with said area; and third code elements for loading said subprogram that is associated with said area in which said vehicle is located.

14. The computer program as defined in claim 12, further comprising a plurality of subprograms, wherein each subprogram includes a plurality of navigation function programs, said navigation function programs performing a plurality of navigation functions respectively on said navigator, and further wherein said navigation functions are performed based on the subprogram that has been selected and loaded.

15. The computer program as defined in claim 13, wherein:

said subprogram comprises a program for restricting the display of a navigation on a display device based on a rule restricting said navigation in a first area.

16. The computer program as defined in claim 13, further comprising:

map data representing a plurality of different areas; and wherein said area search program determines a particular area in said plurality of different areas in which said vehicle is located according to said map data.

17. The computer program as defined in claim 16, wherein:

said map data comprises a plurality of divisions, said divisions being formed by dividing said map; and said area search program determines said particular area corresponding to the one of said divisions on said map in which the position of said vehicle is located.

18. The computer program as defined in claim 16, wherein:

said map data comprises a plurality of links, each of said links respectively representing a road on said map, said map data associating one of said plurality of areas with each of said links; and wherein said area search program determines said particular area for a link on which said vehicle is positioned.

19. The computer program as defined in claim 18, wherein:

said map data comprises a location on said link showing a border between a plurality of said areas, with one of said plurality of areas on one side of said border, and with another one of said plurality of areas on another side of said border; and wherein said area search program determines said particular area in which said vehicle is positioned, according to the position of said vehicle on said link in relation to said location of said border.

20. The computer program as defined in claim 18, wherein said map data further comprises:

a node to define one of the end of said link on said map, and said node representing the location of the border of said plurality of areas on the road.

21. A data structure on a machine-readable medium for implementing a navigation system for a vehicle, comprising:

map data including data to delineate an area, in machine-readable form; and a codeword associated with said area in said data structure and functioning in a computer navigation system to cause said computer navigation system for a vehicle to execute a particular subprogram that is associated with said codeword in said computer navigation system, said subprogram implementing a navigation rule by restricting at least one of (1) user input information accepted by said computer navigation system and (2) navigation information supplied to a user by said computer navigation system, depending on said codeword.

22. The data structure as defined in claim 21, wherein:

said map data includes data delineating a plurality of areas, with a codeword associated with each of said plurality of areas in said data structure, with different codewords causing different subprograms to be executed in said computer navigation system, to thereby cause different navigation rules to be implemented.

23. The data structure as defined in claim 22, wherein:

said map data comprises a plurality of divisions, said divisions being formed by dividing said map.

24. The data structure as defined in claim 22, wherein:

said map data comprises a plurality of links, each of said links respectively representing a road on said map, said map data comprising each of said links and an area therefor.

25. The data structure as defined in claim 24, wherein:

said map data stores a location on said link showing a border between a plurality of said areas, said map data including an area corresponding to one side of said border on said link, and another area corresponding to another side of said border on said link.

26. The data structure as defined in claim 24, wherein said map data further comprises:

a node to define one of the ends of said link associated with a location thereof on said map, and said node representing a border of said areas on said road.

27. A method for navigating a vehicle, comprising the steps of:

detecting a position of said vehicle;

associating an area with said detected position from a plurality of different areas;

supplying navigation information to, and accepting information input by, a user of said vehicle; and restricting at least one of (1) user input information and (2) navigation information supplied to a vehicle user, based on a rule associated with the area associated with said detected position of said vehicle.

28. The method for navigating and positioning a vehicle as defined in claim 27, further comprising the steps of:

retrieving a map which includes said plurality of areas; and determining said area in which said vehicle is positioned according to said map.

29. The method for navigating a vehicle as defined in claim 28, further comprising the steps of:

determining one of a plurality of divisions of said map in which said vehicle is positioned, said divisions being formed by dividing said map; and determining said area of said map in which said vehicle is positioned according to said division.

* * * * *